Oct. 19, 1971  O. M. OAS  3,613,140
WHEEL AND TIRE BRUSH
Filed March 6, 1970

INVENTOR
OBED M. OAS

BY  *Beale and Jones*

ATTORNEYS

United States Patent Office 3,613,140
Patented Oct. 19, 1971

3,613,140
WHEEL AND TIRE BRUSH
Obed M. Oas, Moorhead, Minn., assignor to Northern Car Wash Systems, Moorhead, Minn.
Filed Mar. 6, 1970, Ser. No. 17,202
Int. Cl. B60s 3/06
U.S. Cl. 15—21 D
8 Claims

ABSTRACT OF THE DISCLOSURE

A wheel and tire brush arrangement for automatic vehicle washing devices comprises a horizontal motor driven brush having alternating sections of relatively short, stiff nylon bristles for scrubbing tires and sidewalls and relatively long, soft polypropylene bristles for washing deep set wheels, hubcaps and rocker panels. The brush is movable toward and away from the path traversed by the vehicle being washed so that the same brush may be used to wash the vehicle's rocker panels, as well as the tires, sidewalls, deep set wheels and hubcaps thereof.

FIELD OF THE INVENTION

This invention relates to an improved brush arrangement for automatic vehicle washing devices and, more particularly, to a horizontally disposed rotatable brush for washing the tires, sidewalls, deep set wheels, hubcaps and rocker panels of an advancing vehicle. The brush arrangement includes an elongated scrub brush having alternating sections of relatively short, stiff nylon bristles for washing tires and sidewalls and relatively long, soft polypropylene bristles for washing deep set wheels, hubcaps and rocker panels without the danger of scratching them.

DESCRIPTION OF THE PRIOR ART

In automatic vehicle washing devices wherein a vehicle is advanced continuously past the device, it is necessary to provide one or more brushes to scrub the tires, sidewalls, hubcaps, rocker panels and deep set wheels of the advancing vehicle. Since the tires and the sidewalls generally require more vigorous scrubbing than do the wheels, rocker panels and hubcaps, and since the tires and sidewalls are less easily scratched or marred, it has been a generally accepted belief in the art that at least one brush must be provided for washing the tires and sidewalls and at least one other brush for washing the rocker panels, hubcaps and deep set wheels of the vehicle. This belief is illustrated, for example, in U.S. Patent 3,403,417 to Hanna et al. wherein a horizontally disposed rotatable brush is provided for scrubbing the sidewalls of an advancing vehicle, the brush being positioned sufficiently low to clear the rocker panels. Similarly, U.S. Patent 2,692,214 to Hurst discloses a vertically disposed brush mounted for rotation so that it will engage the wheels of an advancing vehicle below each wheel axis. Although the brush disclosed in Hurst contains an upper and lower group of bristles, the upper group is adapted to engage only the lower half of each hubcap and the portion of the wheel between the hubcap and the tire, while the lower group engages only the tire. Thus, it will be appreciated that the prior art does not disclose the use of a single brush for adequately and safely washing the tires, sidewalls, hubcaps, rocker panels and deep set wheels of an advancing vehicle washing devices.

SUMMARY OF THE INVENTION

An object of the present invention is to provide a simple, economical, and highly effective device for automatically washing the tires, sidewalls, hubcaps, rocker panels and deep set wheels of a vehicle. Another object of the invention is to provide new and improved vehicle washing devices.

It is yet another object of the present invention to overcome the problems encountered in the prior art automatic xehicle washing devices.

It is still another object to provide new and improved vehicle washing devices.

These and other objects are accomplished in accordance with the present invention by providing a horizontally disposed, elongated scrub brush comprising alternating sections of relatively short, stiff bristles composed of stiff nylon, metal wire, or the like, and sections of relatively long, soft bristles composed of polypropylene, synthetic rubber, or the like. The brush is mounted for rotation about its longitudinal axis and is disposed substantially parallel to and immediately adjacent to the path traversed by a vehicle being washed so that the sections of soft, long bristles contact and wash the hubcaps, deep set wheels and rocker panels, while the sections of short, stiff bristles scrub the tires and sidewalls of the vehicle as it advances past the brush station. The brush is mounted for transverse movement toward and away from the vehicle's path so that the long, soft bristles may be moved from their initial or tire washing position against the vehicle's rocker panels when the front tire has advanced beyond the brush station, and then back again to the tire washing position when the rear tire has advanced to the brush station. Suitable nozzles are provided for supplying a cleaning fluid, such as hot soapy water, to the brush sections during a wash cycle. It should be evident that the above described brush arrangement enables a single brush to wash the tires, sidewalls, hubcaps, deep set wheels and rocker panels of an advancing vehicle without scratching or otherwise damaging the vehicle.

BRIEF DESCRIPTION OF THE DRAWINGS

The novel features of the invention are set forth with particularity in the appendant claims, but the invention will be understood more clearly and fully from the detailed description of a preferred embodiment thereof, as set forth in the accompanying drawings, in which:

DETAILED DESCRIPTION

Figure 1:
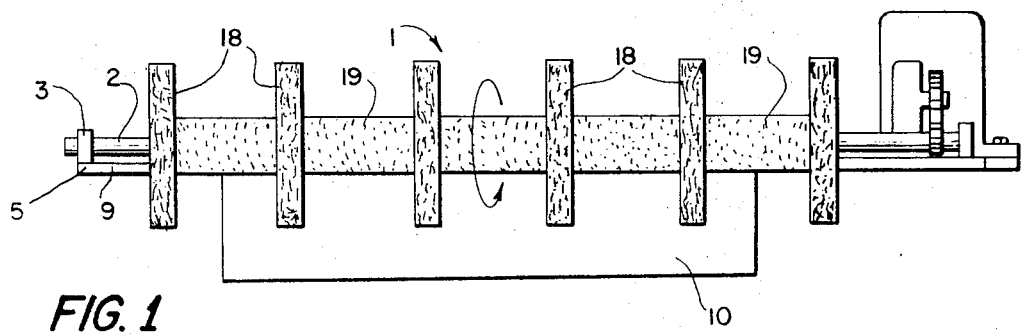
FIG. 1 is a front elevational view of an elongated brush arrangement embodying certain principles of the present invention.
Figure 2:
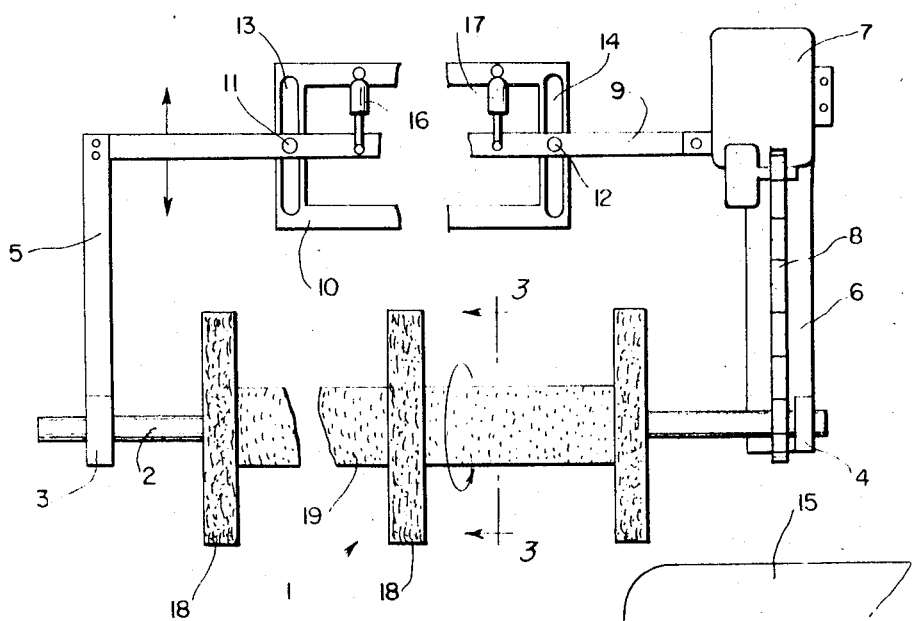
FIG. 2 is a top plan view of a portion of the brush arrangement of the FIG. 1 illustrating one manner in which the brush may be rotatably mounted about its longitudinal axis and moved toward and away from the path of an advancing vehicle.
Figure 3:
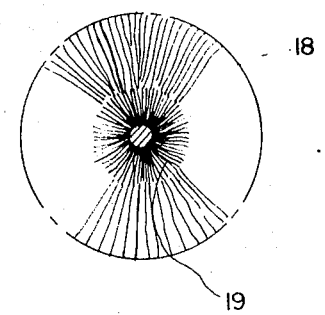
FIG. 3 is a cross-sectional view, taken along line 3—3 of FIG. 2, with portions removed for the sake of clarity, illustrating the relative lengths of the alternating sections of bristles comprising the brush.

Referring now to the drawings, in particularity to FIG. 1, there is shown a brush arrangement embodying certain principles of the present invention. As illustrated, the brush arrangement comprises an elongated rotatable brush 1 mounted about is longitudinal axis on a brush shaft 2 which, is turn, is mounted through suitable bearings 3 and 4 to transverse support arms 5 and 6, respectively. The support arms 5 and 6 are shown more clearly in FIG. 2. The brush 1 is driven, preferably in the direction indicated by the arrows of FIGS. 1 and 2, by any suitable means, such as, for example, a conventional electric motor 7 using a roller chain 8 as the driving means, As shown more clearly in FIG. 2, the motor 7 is bolted to a longitudinal support member 9 which rigidly supports the transverse support arms 5 and 6. The longitudinal support member 9 is mounted on a fixed base 10 by means of pins 11 and 12 which ride in suitable bearings (not shown) in elongated slots 13 and 14, respectively, in the base 10. The longitudinal support 9, and consequently brush 1, may be moved toward and away from the path of an advancing vehicle 15 by any suitable means. One such means is illustrated in FIG. 2, and comprises a pair of fluid pressure actuated cylinder devices 16 and 17 connected between the fixed base 10 and the longitudinal support number 9. As will be discussed more fully hereinbelow, the cylinder devices 16 and 17 cause portions of the brush 1 to be held against the front tire, sidewall, deep set wheel, and hubcap of an advancing vehicle while the tire is adjacent the brush station. In addition, the cylinder devices 16 and 17 cause the brush 1 to advance into engagement with the vehicle's rocker panels when the front tire of the vehicle has advanced beyond the brush station and until the rear tire advances to the brush station, whereupon the cylinder devices 16 and 17 are actuated to return the brush to its original or tire washing station.

The general configuration and physical properties of brush 1 are important to the successful practice of the present invention. As illustrated, the brush 1 is composed of alternating segments or sections of long bristles 18 and short bristles 19. The brush 1 may be formed of a unitary body having long and short bristle sections, or may comprise a plurality of separate short and long disc-like segments or sections suitably mounted in alternating fashion. Thus, it will be appreciated that the manner in which the alternate sections 18 and 19 are provided is relatively unimportant as long as the relative lengths of the bristles 18 and 19 are such that, during a wash cycle, the long bristles 18 wash the rocker panels, hubcaps and deep set wheels, while the short bristles 19 wash the tires and sidewalls. Since the long bristles 18 will engage the hubcaps, deep set wheels and rocker panels of the vehicle, they must be made of a material that will not scratch or otherwise damage the metal and paint which they contact. Accordingly, the long bristles 18 may comprise any relatively soft material such as, for example, polypropylene, horse hair, natural rubber, synthetic rubber, or the like. On the other hand, since the short bristles 19 are designed to engage only the tire and sidewalls of the vehicle, and since the tires and sidewalls can withstand a more highly abrasive action and, in fact, require the use of such abrasive action for adequate scrubbing, the short bristles 19 are made of a relatively stiff substance such as, for example, nylon, metal wire, or the like.

As indicated above, the brush 1 should be designed in such a way that the alternating sections of short, stiff bristles 19 contact only the relatively abrasive resistant tires and sidewalls, and in such a way that only the alternating sections of long, soft bristles 18 contact the deep set wheels, hubcaps and rocker panels. In addition, it will be appreciated that the over-all length of the brush 1 should be sufficient, when considered in conjunction with the speed at which the vehicle advances past the brush station, to adequately wash the tires, sidewalls, hubcaps, wheels and rocker panels. One suitable brush design contemplates an overall brush length of about eight feet, with seven long bristle sections each two inches in length and thirteen inches in diameter, and six short bristle sections each ten inches in length and five inches in diameter. Of course, the lengths and diameters of the long and short bristle sections may be varied, if desired, as may the number of sections and over-all length of the brush. In this regard, the diameter of the alternating sections of long bristles 18 should be at least about 1.5, and preferably about two to three times the diameter the alternating sections of short bristles 19. Similarly, the length of the alternating sections of short bristles 19 should be at least 1.5, and preferably from about two to about six times the length of the alternating sections of long bristles 18. It is to be understood that the size ranges given above are merely illustrative and that such ranges, just as the number of alternate sections and over-all brush length, are matters of choice which can be altered as desired. In addition, it is to be understood that the brush arrangement disclosed above will wash only one side of a vehicle and that two such brush arrangements are required to wash all the tires, sidewalls, wheels, hubcaps and rocker panels of any given vehicle.

During a wash cycle, a vehicle advances along a predetermined path which is between and substantially parallel to two opposing horizontally disposed brushes 1. As the front tires engage the first section of long bristles 18 on each brush, the bristles, which are soft and pliable, bend aside without being damaged. As the vehicle advances slightly and the long bristles 18 clear the front tires, they contact and wash the front hubcaps and deep set wheels; a section of short bristles 19 on each opposing brush now contacting and scrubbing the tires and sidewalls thereof. This action repeats itself as the vehicle continues to advance until the front tires advance past the opposing brushes. At this point, the cylinder devices 16 and 17 are actuated so as to advance brushes 1 toward the vehicle's path, whereby the alternating sections of long bristles 18 on each brush are pushed into engagement with the rocker panels of the vehicle. When the rear tires advance to the brush stations, the cylinder devices 16 and 17 are again actuated to return the brushes 1 back to their tire washing positions, whereafter the rear tires, sidewalls, hubcaps and deep set wheels are scrubbed in the manner described above. During the entire wash cycle, nozzles (not shown) provide hot soapy water, or some other suitable cleaning fluid to the brushes 1.

It is to be understood that the foregoing description is merely illustrative of the principles of the present invention, and that various modifications can be made by those skilled in the art without departing from the spirit and the scope thereof.

I claim:

1. An apparatus for washing vehicles advancing along a predetermined path, which comprises:
    an elongated scrub brush comprising alternating sections of relatively short, stiff bristles and relatively long, soft bristles;
    means for rotatably mounting said scrub brush adjacent to and substantially parallel to the path traversed by the wheels on one side of the advancing vehicle; and
    means for rotating said scrub brush about its longitudinal axis, whereby the alternating sections of relatively short, stiff bristles scrub the tires on one side of the advancing vehicle while the alternating sections of relatively long, soft bristles scrub the hubcaps and wheels on the same side of the vehicle.

2. The combination of claim 1, wherein said short, stiff bristles comprise stiff nylon, and wherein said long, soft bristles comprise soft polypropylene.

3. The combination of claim 1, wherein the diameter of said alternating sections of long, soft bristles is from about two to about three times the diameter of said alternating sections of short, stiff bristles.

4. The combination of claim 3, wherein the length of said scrub brush is at least about two times the diameter of said alternating sections of long, soft bristles.

5. The combination of claim 4, wherein the length of said alternating sections of short, stiff bristles is from about two to about eight times the length of said alternating sections of long, soft bristles.

6. The combination of claim 5, wherein said means for rotatably mounting said brush includes a horizontal shaft mounted to said brush, wherein said means for rotating said brush comprises an electric motor unit and means drivingly coupling said motor unit to said shaft, and including means for moving said brush transversely toward and away from the path traversed by the vehicle so that said brush will be at a first position for washing a front tire, hubcap and wheel on one side of the advancing vehicle, at a second position for washing the rocker panel when the front tire has advanced past said brush, and at said first position again for washing the rear tire, hubcap and wheel when the rear tire has advanced to a position adjacent said brush.

7. The combination of claim 1, wherein said means for rotatably mounting said brush includes a horizontal shaft mount to said brush, and wherein said means for rotating said brush comprises an electric motor unit and means drivingly coupling said motor unit and said shaft.

8. The combination of claim 7, further including means for moving said brush transversely toward and away from the path traversed by the vehicle so that said brush will be at a first position for washing a front tire, hubcap and wheel on one side of the advancing vehicle, at a second position for washing the rocker panel when the front tire has advanced past said brush, and at said first position again for washing the rear tire, hubcap and wheel when the rear tire has advanced to a position adjacent said brush.

References Cited
UNITED STATES PATENTS

| 1,412,732 | 4/1922 | Young | 15—21 D |
| 3,403,417 | 10/1968 | Hanna et al. | 15—21 D |
| 3,346,895 | 10/1967 | Consolo | 15—21 D |

EDWARD L. ROBERTS, Primary Examiner

U.S. Cl. X.R.

15—179